US008805629B2

(12) United States Patent
Yin et al.

(10) Patent No.: US 8,805,629 B2
(45) Date of Patent: Aug. 12, 2014

(54) MAXIMUM POWER POINT TRACKING DEVICE FOR A SOLAR ELECTRIC GENERATION SYSTEM AND A TRACKING METHOD FOR THE SAME

(75) Inventors: Shaowen Yin, Shenzhen (CN); Xiang Zhang, Shenzhen (CN); Rongchun Yang, Shenzhen (CN)

(73) Assignee: BYD Company Limited (CN)

( * ) Notice: Subject to any disclaimer, the term of this patent is extended or adjusted under 35 U.S.C. 154(b) by 286 days.

(21) Appl. No.: 13/169,798

(22) Filed: Jun. 27, 2011

(65) Prior Publication Data
US 2012/0004874 A1 Jan. 5, 2012

(30) Foreign Application Priority Data

Jun. 30, 2010 (CN) .......................... 2010 1 0219102

(51) Int. Cl.
G06F 19/00 (2011.01)
(52) U.S. Cl.
USPC ................ 702/63; 323/299; 323/906; 363/79
(58) Field of Classification Search
USPC ............ 702/63; 320/118, 119, 127; 323/299, 323/906; 363/79
See application file for complete search history.

(56) References Cited

U.S. PATENT DOCUMENTS 5,682,305 A * 10/1997 Kurokami et al. .............. 363/79
2011/0037319 A1 * 2/2011 Matsui et al. ................... 307/43

* cited by examiner

Primary Examiner — Jonathan C Teixeira Moffat
Assistant Examiner — Hien Vo
(74) Attorney, Agent, or Firm — Alston & Bird LLP

(57) ABSTRACT

A maximum-power-point tracking device is provided for a solar electric-generation system that includes a solar battery and a DC/DC converter connected to the solar battery. The device includes a sampling module configured to detect output current and voltage values of the solar battery. A controlling module is configured to calculate a target current value according to the output current and voltage values and a preset current value, and output a controlling signal for controlling the value of a current according to the output current of the solar battery and the target current value. The device also includes a driving module configured to receive the controlling signal from the controlling module and output a driving signal to adjust a output current value of the DC/DC converter to close to the target current value and adjust an output power of the DC/DC converter.

19 Claims, 6 Drawing Sheets

MAXIMUM POWER POINT TRACKING DEVICE FOR A SOLAR ELECTRIC GENERATION SYSTEM AND A TRACKING METHOD FOR THE SAME

CROSS REFERENCE TO RELATED APPLICATION(S)

This application claims the benefit of Chinese Patent Application No. 2010-10219102.4, filed on Jun. 30, 2010, the content of which is incorporated by reference herein in its entirety.

TECHNOLOGICAL FIELD

The present disclosure relates to solar energy, more particularly to a maximum power point tracking device of solar electric-generation system and tracking method of the same.

BACKGROUND

As is generally known, solar energy has reduced pollution and is readily available. But the conversion efficiency of solar batteries is too low, which may lead to the desirability of tracking the maximum power point. The output power of a solar battery is responsive to sunshine intensity and sunshine temperature, and for certain sunshine intensity and sunshine temperature, the maximum power outputted by the solar battery is definite. Thus, a method for improving the work efficiency of a solar battery may include controlling the solar battery to work in the maximum power point. In an instance in which the solar battery works on the maximum power point, the output voltage may be lower than the open circuit voltage, which may limit the range of the output voltage. At present, conventional solar electric-generation systems are unable to simultaneously track a maximum power point and expand an output voltage range of the maximum power point. Thus, the solar energy may be wasted.

SUMMARY

The present disclosure provides a maximum power point tracking device and a tracking method of the same for enlarging the range of the output power of the solar battery when tracking the maximum power point.

The present disclosure provides a maximum power point tracking device for a solar electric-generation system that includes a solar battery and a DC/DC converter connected to the solar battery. The maximum power point tracking device includes a sampling module electronically connected to an output terminal of the solar battery and configured to detect an output current value and a output voltage value of the solar battery. The device includes a controlling module connected to the sampling module and configured to: calculate a target current value according to the output current value and the output voltage value of the solar battery and a preset current value; and output a controlling signal for controlling the value of a current according to the output current of the solar battery and the target current value. The device also includes a driving module electronically connected to the DC/DC converter and the controlling module. The driving module is configured to: receive the controlling signal from the controlling module; and output a driving signal to adjust an output current value of the DC/DC converter to close to the target current value, and to adjust an output power of the DC/DC converter.

The present disclosure further provides a method for tracking the maximum power of a solar electric-generation system. The method may include detecting an output current and an output voltage of a solar battery, and calculating a target current value according to the output current and the output voltage of the solar battery and a preset current value. And the method may include outputting a controlling signal for adjusting a value of a output current of the solar electric-generation system to close to the target current value according to the output current of the solar battery and the preset current value.

The maximum power point tracking device for the solar electric-generation system and the tracking method for the same provided by the present disclosure may calculate the target current value according to the output current and the output voltage of the solar battery and the preset current value to make the solar battery to work in the maximum power point; and adjust the value of the output voltage of the solar battery according to the DC/DC converter to track a maximum power point and expand an output voltage range of the maximum power point at the same time.

BRIEF DESCRIPTION OF THE DRAWINGS

Figure 1:
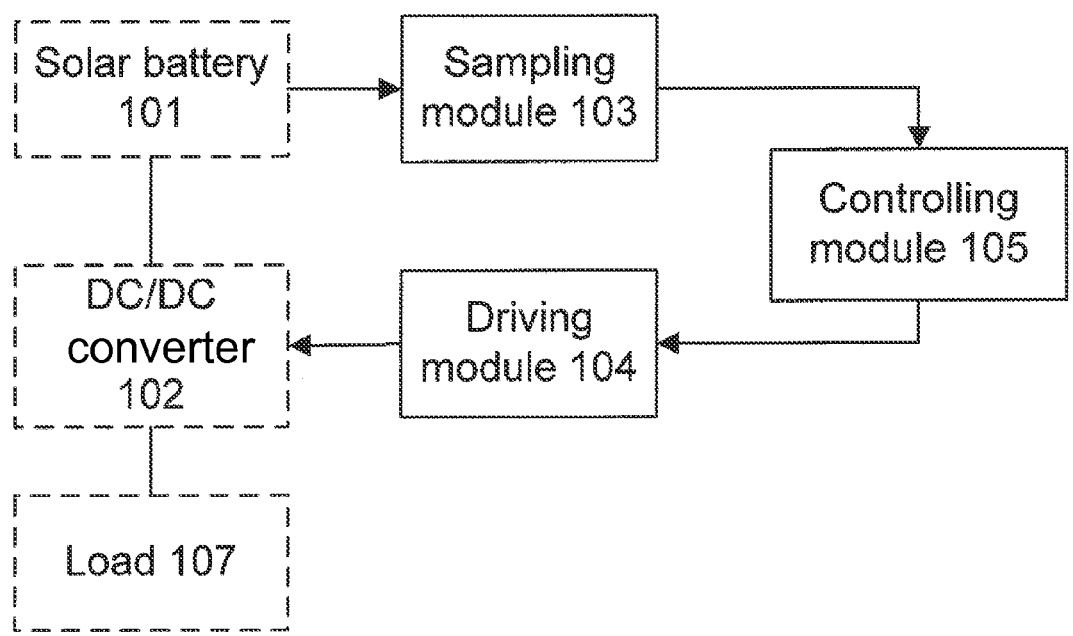
Figure 2:
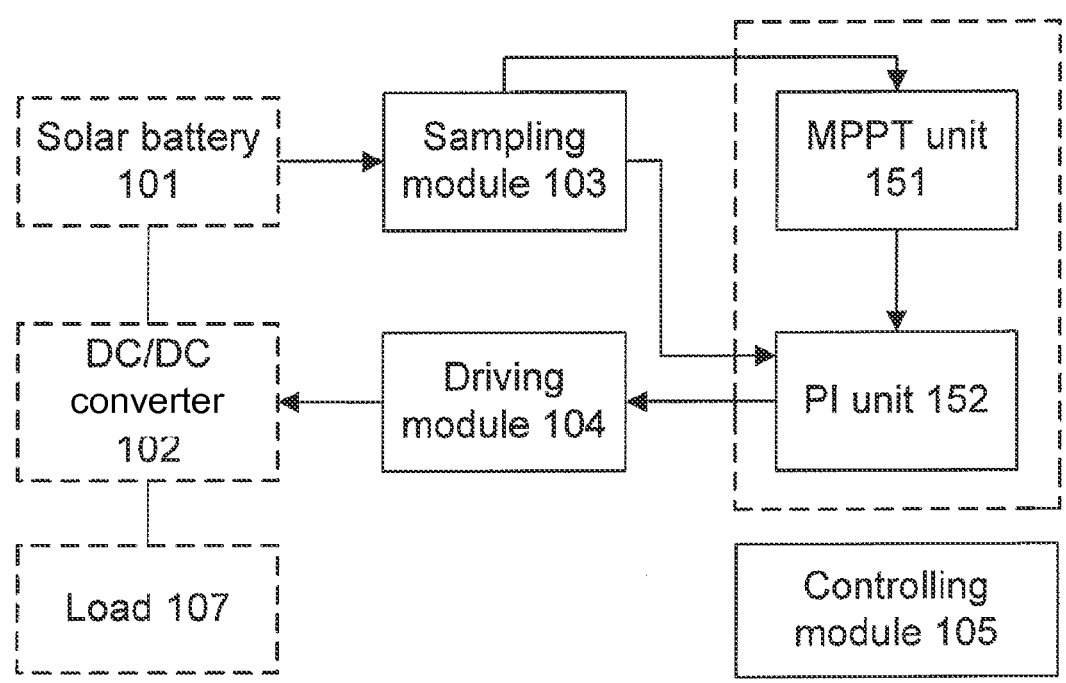
Figure 3:
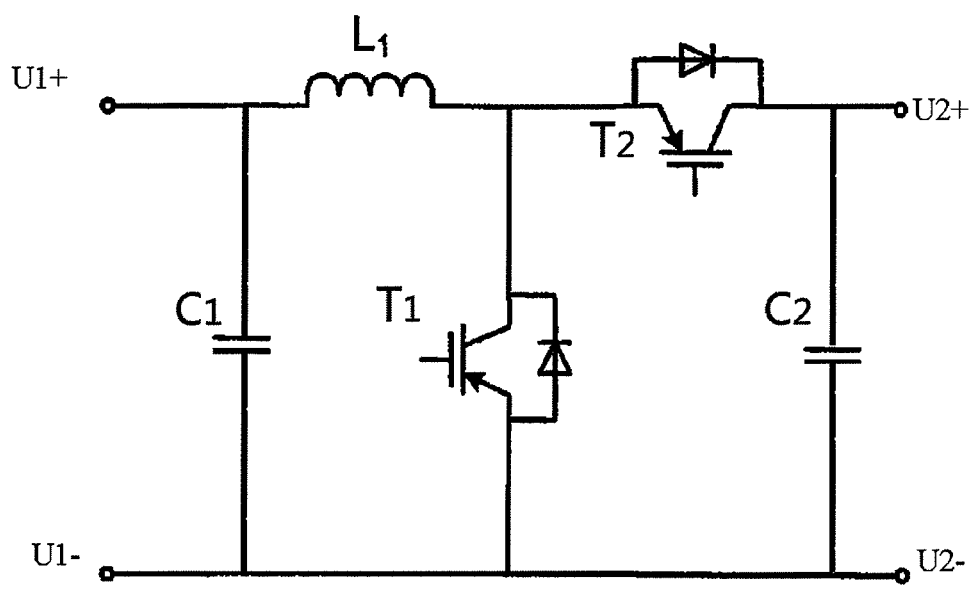
Figure 4:
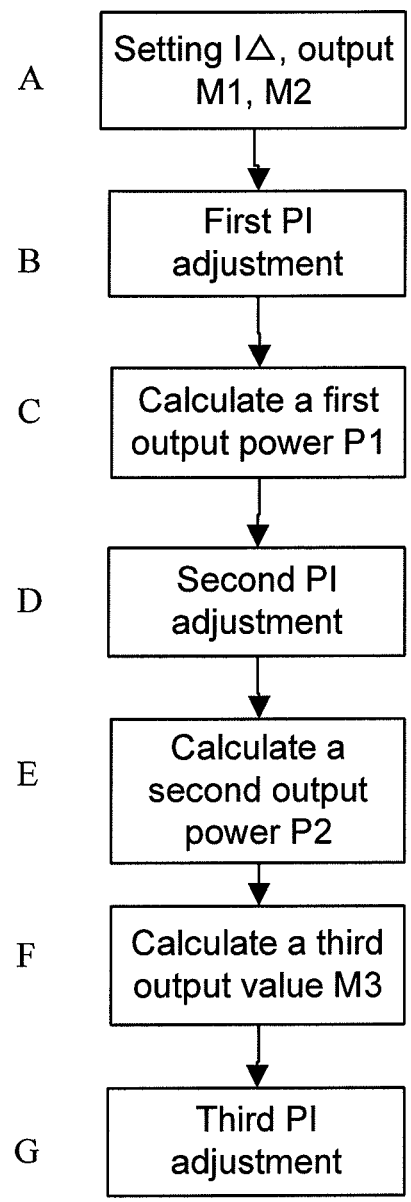
Figure 5:
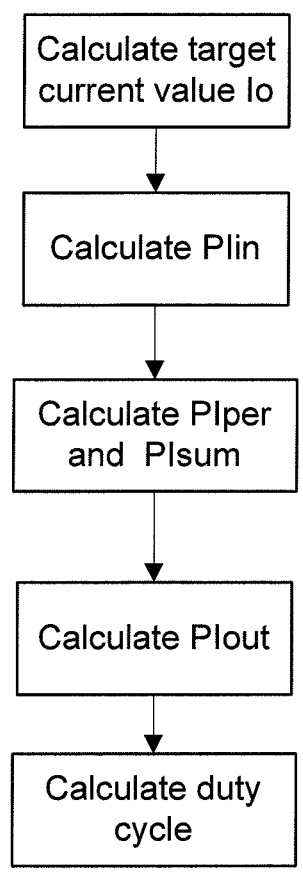
Figure 6:
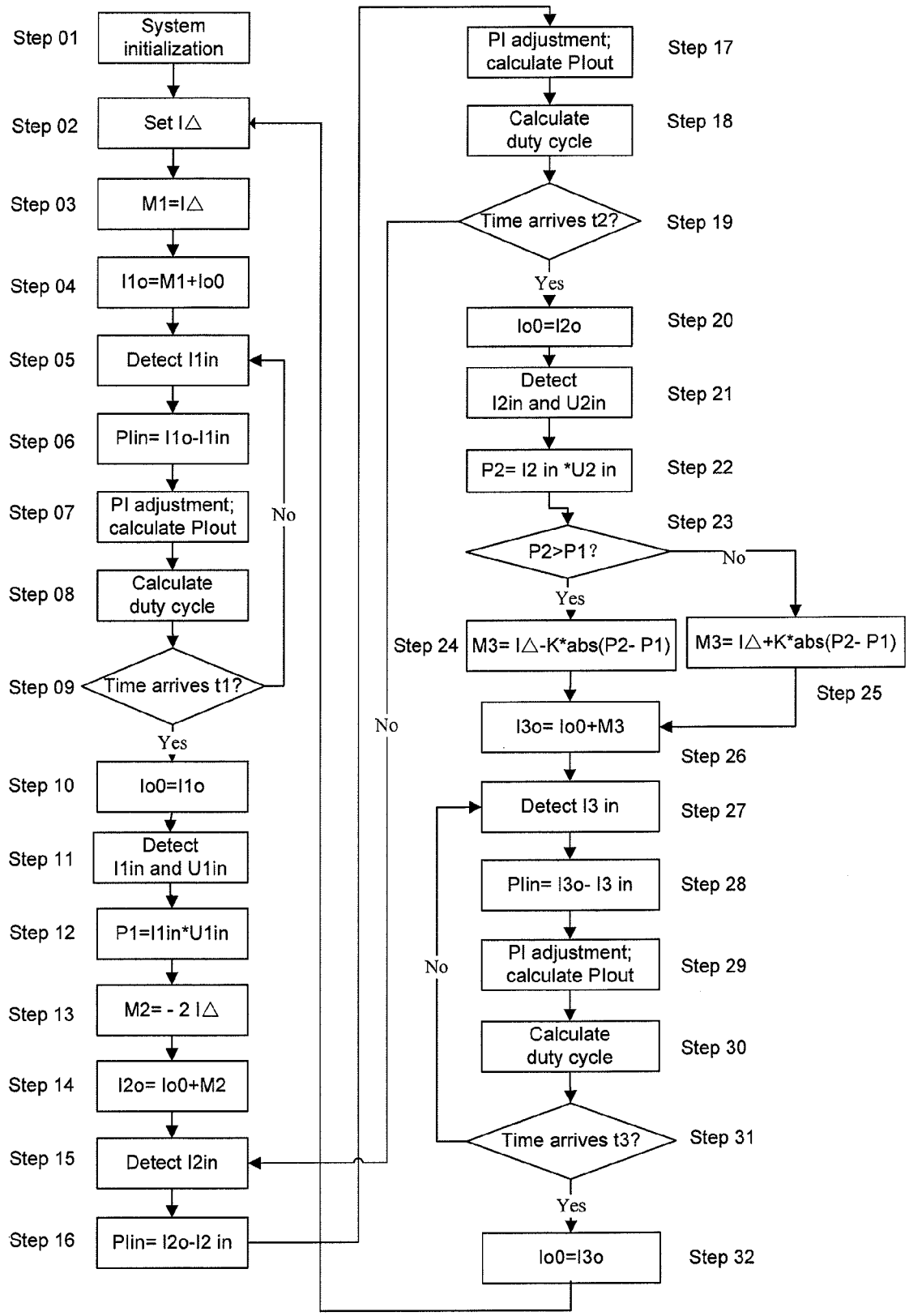

Having thus described example embodiments of the present invention in general terms, reference will now be made to the accompanying drawings, which are not necessarily drawn to scale, and wherein:

FIG. 1 is a structure diagram of a maximum power point tracking device for a solar electric-generation system according to an example embodiment of the disclosure;

FIG. 2 is a structure diagram of a maximum power point tracking device for a solar electric-generation system according to an example embodiment of the disclosure;

FIG. 3 is a circuit diagram of a DC/DC converter according to an example embodiment of the disclosure;

FIG. 4 is a flow diagram of a tracking method for a solar electric-generation system according to an example embodiment of the disclosure;

FIG. 5 is a flow diagram of a PI (proportional-integral) adjustment method according to an example embodiment of the disclosure; and FIG. 6 is a flow diagram of a tracking method for a solar electric-generation system according to another example embodiment of the disclosure.

DETAILED DESCRIPTION

The present invention now will be described more fully with reference to the accompanying drawings, in which some, but not all embodiments of the invention are shown. This invention may be embodied in many different forms and should not be construed as limited to the embodiments set forth; rather, these example embodiments are provided so that this disclosure will be thorough and complete, and will fully convey the scope of the invention to those skilled in the art. Like numbers refer to like elements throughout.

Terms such as "substantially," "about," "nearly," "approximately" or the like as used in referring to a relationship between two objects or values are intended to reflect not only an exact relationship but also variances in that relationship that may be due to various factors such as common or accepted error tolerances, variations or the like. It should further be understood that although some values or other relationships may be expressed herein without a modifier, these values or other relationships may also be exact or may include a degree of variation due to various factors such as common or accepted error tolerances, risk tolerances, variations or the like.

As shown in FIG. 1, according to an example embodiment of the present disclosure, a maximum-power-point tracking (MPPT) device for a solar electric-generation system is provided. As shown, the device includes a solar battery (101) and a DC/DC converter (102) connected to the solar battery (101). The device also includes a sampling module (103) electronically connected to an output terminal of the solar battery (101) and configured to detect an output current value and an output voltage value of the solar battery (101). A controlling module (105) is connected to the sampling module (103) and configured to calculate a target current value according to the output current and voltage values of the solar battery (101) and a preset current value, and output a controlling signal according to the output current of the solar battery (101) and the target current value. A driving module (104) is electronically connected to the DC/DC converter (102) and the controlling module (105). The driving module (104) is configured to receive the controlling signal from the controlling module (105); and output a driving signal to adjust an output current value of the solar battery (101) to close to the target current value, and to adjust an output power of the DC/DC converter (102).

As shown in FIG. 2, according to an example embodiment of the present disclosure, the controlling module (105) may include a MPPT unit (151) connected to the sampling module (103), and a proportional-integral (PI) unit (152) connected to the MPPT unit (151), the sampling module (103) and the driving module (104). The MPPT unit (151) is configured to calculate the output power of the solar battery (101) according to the output voltage and the output current of the solar battery (101), and change the output value of the MPPT unit (151) according to the output power and the preset current value. The PI unit (152) is configured to calculate the target current value according to the output value of the MPPT unit (151), calculate a duty cycle of the controlling signal according to the target current value and the output current of the solar battery (101), and output the controlling signal for controlling the value of a current.

The sampling module (103) may include a voltage sensor and a current sensor for detecting the value of the output voltage and the output current of the solar battery (101).

The DC/DC converter (102) may be a bidirectional DC/DC converter including a first positive terminal U1+, a second positive terminal U2+, a first negative terminal U1− and a second negative terminal U2−. The output voltage of the maximum power point of the solar battery (101) may be boosted or bucked via the bidirectional DC/DC converter for expanding the output voltage range of the maximum power point.

As shown in FIG. 3, according an example embodiment of the present disclosure, a bidirectional DC/DC converter may be implemented by a circuit including a first positive terminal U1+ connected to one end of an inductor L1 and one end of a first capacitor C1. Another end of the inductor L1, in turn, is connected to a drain of a first switch tube T1 and a source of a second switch tube T2. A source of the first switch tube T1 and another end of the first capacitor C1 are connected to the first negative terminal U1− and the second negative terminal U2−.

As also shown in FIG. 3, a drain of the second switch tube T2 is connected to the second positive terminal U2+ and one end of a second capacitor C2. Another end of the second capacitor C2 is connected to the first negative terminal U1− and the second negative terminal U2−. And a gate of the first switch tube T1 and a gate of the second switch tube T2 are connected to the output terminal of the control module (104). In operation, the turn-on time of the first switch tube T1 and the second switch tube T2 may be controlled by a driving signal of the driving module (104). In an instance in which the first switch tube T1 is ON, the second switch tube T2 is OFF. And in an instance in which the first switch tube T1 is OFF, the second switch tube T2 is ON.

In an instance in which the first positive terminal U1+ and the first negative terminal U1− of the DC/DC converter (102) are connected to the solar battery (101), and the second positive terminal U2+ and the second negative terminal U2− of the DC/DC converter (102) are connected to a load (107), the DC/DC converter may boost to the voltage of the solar battery (101) to control the first switch tube T1 ON and the second switch tube T2 OFF. In an instance in which the second positive terminal U2+ and the second negative terminal U2− of the DC/DC converter (102) are connected to the solar battery (101), and the first positive terminal U1+ and the first negative terminal U1− of the DC/DC converter (102) are connected to a load (107), the DC/DC converter may buck to the voltage of the solar battery (101) to control the first switch tube T1 ON and the second switch tube T2 OFF. This may expand an output voltage range of the maximum power point.

The present disclosure further provides a method for tracking the maximum power of a solar electric-generation system. The method may include detecting an output current and an output voltage of a solar battery (101), and calculating a target current value according to the output current and the output voltage of the solar battery (101) and a preset current value. The method may also include outputting a controlling signal for adjusting a value of an output current of the solar electric-generation system to close to the target current value according to the output current of the solar battery (101) and the preset current value.

As shown in FIG. 4, a tracking method for a solar electric-generation system is also provided according to an example embodiment of the disclosure. As shown at step A), the tracking method includes setting a preset current value IΔ, and outputting a first value M1 and a second M2 according to the preset current value IΔ. At step B), the method includes detecting a value of the output current of the solar battery (101), and processing a first PI adjustment according to the first value M1 and the output current of the solar battery (101) to calculate the duty cycle of the controlling signal for adjusting the output current of the solar electric-generation system to close to a first target current value.

At step C), the method includes detecting the output current and the output voltage of the solar battery (101) after the first PI adjustment, and calculating a first output power P1 of the solar battery (101).

At step D), the method includes detecting a value of the output current of the solar battery (101), and processing a second PI adjustment according to the second value M2, the output current of the solar battery (101) and the first target current value to calculate the duty cycle of the controlling signal for adjusting the output current of the solar electric-generation system to close to a second target current value.

At step E), the method includes detecting the output current and the output voltage of the solar battery (101) after the second PI adjustment, and calculating a second output power P2 of the solar battery (101). At step F), the method includes comparing the first output power P1 after the first PI adjustment to the second output power P2 after the second adjustment, and calculating a third output value M3 according to the comparison result and the preset current value IΔ.

And at step G), the method includes detecting the value of the output current of the solar battery (101), and processing a third PI treatment according to the third output value M3, the output current of the solar battery (101) and the second target current value to calculate the duty cycle of the controlling signal for adjusting the output current of the solar electric-generation system to close to a third target current value.

In an instance in which the output value of the MPPT unit (151) is positive, the MPPT unit (151) runs a positive disturbance; and in an instance in which the output value of the MPPT unit (151) is negative, the MPPT unit (151) runs a negative disturbance. In the tracking method, M1=IΔ and M2=−2IΔ. This may ensure that the amplitude of the positive disturbance is equal to the amplitude of the negative disturbance. In other terms, M1 being equal to IΔ and M2 being equal to −2IΔ may make the positive trend and negative trend of the current in a same range at first, and then exactly track the maximum power point of the solar battery (101) according to a change of the output power of the solar battery (101). Conversely, the tracking method may run a negative disturbance at first, and then run a positive disturbance, where accordingly, M1=−IΔ and M2=2IΔ.

Generally, the output voltage and the output current of the solar battery (101) may be changed in real-time, so the maximum power point of the solar battery (101) may not track exactly in a certain time range. In the present disclosure, the maximum power point current may be detected by disturbance, and the output current of the solar battery (101) may steadily flow in a certain time range by PI adjustment for exactly tracking a maximum power point of the solar battery (101) in the certain time range. In other terms, the turn-on time of the first switch tube T1 and/or the second switch tube T2 may be controlled by adjusting the duty cycle of the control signal of the control module. In this regard, the value of the output current of the solar battery (101) may be adjusted by adjusting the value of the load of the solar battery (101) for making the output current of the solar battery (101) to keep stable after disturbance.

As shown in FIG. 5, example embodiments may also provide a method of PI adjustment. As shown, this method may include calculating a target current value Io according to the first value M1 and the second M2. The method may also include calculating an input value $PI_{in}$ of the PI adjustment according to the target current value $I_o$ and the output current $I_{in}$ of the solar battery (101), where $PI_{in}=I_o-I_{in}$. In addition, the method may include calculating a proportional $PI_{per}$ and an integration $PI_{sum}$ of the PI adjustment according to the input value $PI_{in}$, where $PI_{per}=PI_{in}*K_p$, $PI_{sum}=PI_{in}*K_i$. The method may include calculating an output value $PI_{out}$ of the PI adjustment according to the $PI_{per}$ and the $PI_{sum}$, where $PI_{out}=PI_{in}+PI_{sum}$. And the method may include calculating the duty cycle of the controlling signal according to $PI_{out}$.

In the PI adjustment method, the duty cycle may be equal to $PI_{out}$ divided by a constant value K. The constant value K may be in the range of 2000-3000, and may vary with the voltage class of the system. When $PI_{out}$ is calculated, the constant value K may be limited to less than or equal to 3000. And in an instance in which the calculated value is greater than 3000, the constant value K may be limited to 3000.

The maximum power point of the solar battery (101) may mutable, and in such instances, only by ceaseless disturbance the solar battery (101) may work in the maximum power point. The tracking method may include comparing an output power of the solar battery (101) after a positive disturbance, with an output power of the solar battery (101) after a negative disturbance. In one instance, the difference between the output power of the solar battery (101) after the positive disturbance, and the output power of the solar battery (101) after the negative disturbance, is relatively large. In this instance, a speed of the adjustment to the target current value of the third PI adjustment is relatively fast, and the current value obtained by the third PI adjustment is relatively large. Conversely, in another instance, the difference between the output power of the solar battery (101) after positive disturbance, and the output power of the solar battery (101) after negative disturbance, is relatively small. In this other instance, a speed of the adjustment to the target current value of the third PI adjustment is relatively slow, and the current value obtained by the third PI adjustment is relatively small. This may reduce the tracking time early in tracking the maximum power, and increase the tracking stability later in tracking maximum power. And the stable maximum power may be outputted by the third PI adjustment.

The effect of the first PI adjustment and the second PI adjustment may be disturbance, so the step size of the first PI adjustment and the second PI adjustment may be small, for example, IΔ=3 Amps. Early in the PI adjustment, a small disturbance may cause large power change, so the difference between the two disturbances may increase and cause the target current value $I_o$ of the third PI adjustment to increase fast. Later in the PI adjustment, a small disturbance may cause a small power change, so the difference between the two disturbances may decrease and cause the target current value $I_o$ of the third PI adjustment to increase slowly.

In an instance in which the output power of the solar battery (101) after positive disturbance is equal to the output power of the solar battery (101) after negative disturbance, the DC/DC converter may steadily work in the maximum power point. Thus, the step F of the tracking method may include setting the third output value M3 equal to IΔ+k*abs(P2−P1) in an instance in which P1 is greater than P2, or setting the third output value M3 equal to IΔ−k*abs(P2−P1) in an instance in which P1 is less than or equal to P2. In the preceding, k is a coefficient whose values range from 0 to 1, and abs (P2−P1) refers to the absolute of the difference.

Reference is now made to FIG. 6, which illustrates a tracking method for solar electric generation according to another example embodiment of the disclosure. As shown at steps 01 and 02, the method includes system initialization and setting a preset current value IΔ. At step 03, the method includes MPPT unit (151) running a positive disturbance, and thereafter calculating an output value M1=IΔ.

At step 04, the method includes calculating a target current value $I1_o$ according to M1, where $I1_o=M1+I0_o$, and $I0_o$ is an initial target current value.

At step 05, the method includes detecting a present output current of the solar battery (101) $I1_{in}$; and at step 06, the method includes calculating an input value $PI_{in}$ of the PI adjustment according to the target current value $I1_o$ and the output current $I1_{in}$ of the solar battery (101), where $PI_{in}=I1_o-I1_{in}$.

At step 07, the method includes running a PI adjustment, calculating a proportional $PI_{per}$ and an integration $PI_{sum}$ of the PI adjustment according to the input value $PI_{in}$, and calculating an output value $PI_{out}$ of the PI adjustment according to the $PI_{per}$ and the $PI_{sum}$, where $PI_{per}=PI_{in}*K_p$, $PI_{sum}=PI_{in}*K_i$ and $PI_{out}=PI_{in}+PI_{sum}$.

At step 08, the method includes calculating the duty cycle of the controlling signal according to $PI_{out}$, for adjusting the output current of the solar battery (101) to close to the $I1_o$; and at step 09, the method includes judging whether time arriving a first reference value t1 or not. If no, returning step 05, and if yes, entering step 10. At step 10, then, the method includes recording an initial value $I0_o$ of the present target current value, where $I0_o=I1_o$.

At step 11, the method includes detecting a present output current $I1_{in}$ of the solar battery (101) and a present output voltage $U1_{in}$ of the solar battery (101); and at step 12, the method includes calculating and recording a present output power P1 of the solar battery (101), where $P1=I1_{in}*U1_{in}$.

At step 13, the method includes the MPPT unit (151) running a negative disturbance, and thereafter calculating an output value $M2=-2I\Delta$.

At step 14, the method includes calculating a target current value $I2_o$ according to M2; wherein $I2_o=M2+I0_o$.

At step 15, the method includes detecting a present output current of the solar battery (101) $I2_{in}$; and at step 16, the method includes calculating an input value $PI_{in}$ of the PI adjustment according to the target current value $I2_o$ and the output current $I2_{in}$ of the solar battery (101), wherein $PI_{in}=I2_o-I2_{in}$.

At step 17, the method includes running a PI adjustment, calculating a proportional $PI_{per}$ and an integration $PI_{sum}$ of the PI adjustment according to the input value $PI_{in}$, calculating an output value $PI_{out}$ of the PI adjustment according to the $PI_{per}$ and the $PI_{sum}$, where $PI_{per}=PI_{in}*K_p$, $PI_{sum}=PI_{in}*K_i$ and $PI_{out}=PI_{in}+PI_{sum}$.

At step 18, the method includes calculating the duty cycle of the controlling signal according to $PI_{out}$ for adjusting the output current of the solar battery (101) to close to the $I2_o$; and at step 19, the method includes judging whether time arriving a second reference value t2 or not. If not, return step 15; but if yes, enter step 20. At step 20, then, the method includes recording an initial value IN of the present target current value, where $I0_o=I2_o$.

At step 21, the method includes detecting a present output current $I2_{in}$ of the solar battery (101) and a present output voltage $U2_{in}$ of the solar battery (101); and at step 22, the method includes calculating and recording a present output power P2 of the solar battery (101), where $P2=I2_{in}*U2_{in}$.

At step 23, the method includes comparing P1 and P2 to determine whether P2 is greater than P1. If yes, then enter step 24; but if not, enter step 25. At steps 24 and 25, the method includes calculating a third output value M3. At step 24, $M3=I\Delta-k*abs(P2-P1)$; and at step 25, $M3=I\Delta+k*abs(P2-P1)$. After either step, the method may then proceed to step 26.

At step 26, the method includes calculating a target current value $I3_o$ according to M2; where $I3_o=M3+I0_o$.

At step 27, the method includes detecting a present output current of the solar battery (101), $I3_{in}$; and at step 28, the method includes calculating an input value $PI_{in}$ of the PI adjustment according to the target current value $I3_o$ and the output current $I3_{in}$ of the solar battery (101), where $PI_{in}=I3_o-I3_{in}$.

At step 29, the method includes running PI adjustment, calculating a proportional $PI_{per}$ and an integration $PI_{sum}$ of the PI adjustment according to the input value $PI_{in}$, calculating an output value $PI_{out}$ of the PI adjustment according to the $PI_{per}$ and the $PI_{sum}$, where $PI_{per}=PI_{in}*K_p$, $PI_{sum}=PI_{in}*K_i$ and $PI_{out}=PI_{in}+PI_{sum}$.

At step 30, the method includes calculating the duty cycle of the controlling signal according to $PI_{out}$ for adjusting the output current of the solar battery (101) to close to the $I3_o$; and at step 31, the method includes judging whether time arriving a third reference value t3 or not. If not, return step 27; but if yes, enter step 32. At step 32, then, the method includes recording an initial value $I0_o$ of the present target current value, and returning step 02, where $I0_o=I3_o$.

In the above mentioned steps, the first reference value t1, the second reference value t2 and the third reference value t3 of one example are about 1 second. The values of the first reference value t1, the second reference value t2 and the third reference value t3 are changeable. In an instance in which the values are too small, the computational complexity of the control module may be increased; or in an instance in which the values are too large, the solar battery (101) may not be adjusted to work in the maximum power point.

Also in the above mentioned steps, the target current value $I_o$ may be cumulatively calculated. For example, in step 04, $I1_o=M1+I0_o$, so $I1_o=I\Delta+I0_o$, where $I0_o=0$, so $I1_o=I\Delta$. Also, for example, in the step 14, $I2_o=I0_o+M2$, $M2=-2I\Delta$, so $I2_o=-2I\Delta+I0_o$, where $I0_o=I1_o=I\Delta$, so $I2_o=-I\Delta$. And in the step 26, for example, $I3_o=I0_o+M3$, $M3=I\Delta-k*abs(P2-P1)$ or $M3=I\Delta+k*abs(P2-P1)$, so $I3_o=I0_o+I\Delta-k*abs(P2-P1)$ or $I3_o=I0_o+I\Delta+k*abs(P2-P1)$, where $I0_o=I2_o=-I\Delta$, so $I3_o=-k*abs(P2-P1)$ or $I3_o=k*abs(P2-P1)$.

Even further, in step 07, $K_p$ may be a proportional coefficient, $K_i$ may be an integral coefficient, and the value range of $K_p$ and $K_i$ may be known to the person skilled in the art.

Many modifications and other embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A maximum-power-point tracking device for a solar electric-generation system that includes a solar battery and a DC/DC converter, the maximum-power-point tracking device comprising:
   a sampling module configured to detect an output current and an output voltage of the solar battery;
   a controlling module configured to:
      determine a target current value according to an initial target current value and a preset current difference value;
      determine a value of an input current and a value of an output current of a proportional-integral adjustment according to the output current of the solar battery and the target current value;
      determine a duty cycle according to the output current of the proportional-integral adjustment; and
      output a controlling signal for controlling the output current of the solar battery according to the duty cycle; and
   a driving module configured to:
      receive the controlling signal from the controlling module; and
      output a driving signal to adjust the output current of the solar battery to the target current value according to the controlling signal.

2. The maximum-power-point tracking device of claim 1, wherein the controlling module is further configured to:
   determine the target current value by one of positive disturbance process and negative disturbance process according to the preset current difference value and the initial target current value.

3. The maximum-power-point tracking device of claim 1, wherein the DC/DC converter of the solar electric-generation system is a bidirectional DC/DC converter.

4. The maximum-power-point tracking device of claim 1, wherein the DC/DC converter is coupled between the solar battery and a load.

5. The maximum-power-point tracking device of claim 1, wherein the controlling module is further configured to configured to:
   determine a first output power of the solar battery after a positive disturbance process;
   determine a second output power of the solar battery after a negative disturbance process;
   compare the first output power to the second output power; and
   determine an adjust value based on the comparison result and the initial target current value.

6. The maximum-power-point tracking device of claim 5, wherein the controlling module is configured to determine an adjust target current value based on the adjust value, and wherein the adjust target current value is determined to be a result of adding the adjust value to the initial target current value in an instance in which the second output power is not larger than the first output power.

7. The maximum-power-point tracking device of claim 5, wherein controlling module is configured to determine an adjust target current value based on the adjust value, and wherein the adjust target current value is determined to be a result of subtracting the adjust value from the initial target current value in an instance in which the second output power is larger than the first output power.

8. The maximum-power-point tracking device of claim 1, wherein the controlling module is further configured to determine a positive disturbance target current value acquired by a positive disturbance process, and wherein the preset current value is added to the initial target current value in the positive disturbance process.

9. The maximum-power-point tracking device of claim 1, wherein the controlling module is further configured to determine a negative disturbance target current value acquired by a negative disturbance process, and wherein the preset current difference value is subtracted from the initial target current value in the negative disturbance process.

10. The maximum-power-point tracking device of claim 1, wherein the controlling module is further configured to determine an output current value of the proportional-integral adjustment according to the input current value of the proportional-integral adjustment, and wherein the duty cycle is determined by the output current value of the proportional-integral adjustment.

11. A method for tracking the maximum power of a solar electric-generation system including a solar battery and a DC/DC converter, the method comprising:
    detecting, by a sampling module, an output current and an output voltage of the solar battery;
    determining, by a controlling module, a target current value according to an initial target current value and a preset current difference value; and
    determining a value of an input current and a value of an output current of a proportional-integral adjustment according to the output current of the solar battery and the target current value;
    determine a duty cycle according to the output current of the proportional-integral adjustment; and
    outputting, by the controlling module, a controlling signal for adjusting the output current value of the solar battery to the target current value according to the duty cycle.

12. The method of claim 11 further comprising:
    determining a first output power of the solar battery after a positive disturbance process;
    determining a second output power of the solar battery after a negative disturbance process;
    comparing the first output power to the second output power; and
    determining an adjust value based on the comparison result and the initial target current value.

13. The method of claim 12, further comprising determining an adjust target current value based on the adjust value, wherein the adjust target current value is determined to be a result of adding the adjust value to the initial target current value in an instance in which the second output power is not larger than the first output power.

14. The method of claim 12, further comprising determining an adjust target current value based on the adjust value, wherein the adjust target current value is determined to be a result of subtracting the adjust value from the initial target current value in an instance in which the second output power is larger than the first output power.

15. The method of claim 11, wherein the target current value is determined by one of positive disturbance process and negative disturbance process according to the preset current difference value and the initial target current.

16. The method of claim 11, further comprising outputting a driving signal, by a driving module, to adjust the output current value of the solar battery to the target current value according to the duty cycle.

17. The method of claim 11, further comprising determining a positive disturbance target current value acquired by a positive disturbance process, and wherein the preset current difference value is added to the initial target current value in the positive disturbance process.

18. The method of claim 11, further comprising determining a negative disturbance target current value acquired by a negative disturbance process, and wherein the preset current value is subtracted from the initial target current value in the negative disturbance process.

19. The method of claim 11, further comprising determining an output current value of the proportional-integral adjustment according to the input current value of the proportional-integral adjustment, and wherein the duty cycle is determined by the output current value of the proportional-integral adjustment.

* * * * *